(12) United States Patent
Matsumoto et al.

(10) Patent No.: US 6,444,323 B1
(45) Date of Patent: Sep. 3, 2002

(54) SEMI-CONDUCTIVE SILICONE RUBBER COMPOSITION

(75) Inventors: Wataru Matsumoto; Tetsuya Nakamura; Koji Sawada, all of Kobe (JP)

(73) Assignee: Tigers Polymer Corporation, Osaka (JP)

( * ) Notice: Subject to any disclaimer, the term of this patent is extended or adjusted under 35 U.S.C. 154(b) by 0 days.

(21) Appl. No.: 09/662,040

(22) Filed: Sep. 14, 2000

(30) Foreign Application Priority Data

Sep. 21, 1999 (JP) ............................. 11-266610
Feb. 3, 2000 (JP) ...................... 2000-032658
Jun. 8, 2000 (JP) ...................... 2000-177142

(51) Int. Cl.$^7$ ............................. B32B 25/20
(52) U.S. Cl. ................. 428/447; 524/496; 524/495; 524/588; 492/16; 428/450; 528/24
(58) Field of Search ................ 428/450, 447; 524/496, 595, 558; 492/16; 528/24

(56) References Cited

FOREIGN PATENT DOCUMENTS

| JP | 54-139659 | 10/1979 | .......... C08L/83/04 |
| JP | 10-254215 | 9/1998 | .......... G03G/15/02 |
| JP | 11-106657 | * 4/1999 | |

OTHER PUBLICATIONS

Encyclopedia of Chemical Technology, 4$^{th}$ Ed., vol. 4, Edited by Kroschwitz, Wiley–Interscience, 1992, pp. 1060–1061.*

* cited by examiner

*Primary Examiner*—Robert Dawson
*Assistant Examiner*—Kuo-Liang Peng
(74) *Attorney, Agent, or Firm*—Gerald T. Bodner

(57) ABSTRACT

A semi-conductive silicone rubber composition contains carbon black. The carbon black contains thermal black obtained by thermally cracking a natural gas and having a specific surface area—nitrogen absorption method of 8.0 to 10.0 m$^2$/g, a dibutyl phthalate absorption number (dibutyl phthalate absorption number) of 30 to 40 cm$^3$/100 g and an averaged particle size of 200 to 330 nm.

4 Claims, 4 Drawing Sheets

SEMI-CONDUCTIVE SILICONE RUBBER COMPOSITION

BACKGROUND OF THE INVENTION

1. Field of the Invention

This invention relates generally to semi-conductive silicone rubber compositions and, more particularly, to a semi-conductive silicone rubber composition which exhibits electric conductivity stable over a broad range of aspects.

2. Description of the Prior Art

Conventionally, silicone rubber compositions, for cure into silicone rubber, having a volume resistance value of approximately $10^5$ to $10^{12}$ Ω·cm as an electric conductivity in the semi-conductive region have being broadly utilized for the applications of ranging from transfer rollers used as one members in image forming devices for electrophotographic apparatuses over to a variety of OA equipment and electronic components, as can be known from Japanese Patent Laid-open No. H10-254215 laid open on Sep. 25, 1998.

These semi-conductive silicone rubber compositions, in general, are given electric conductivity by adding insulating silicone rubber with conductive carbon black. For example, Japanese Patent Laid-open No. S54-139659 (Oct. 30, 1979) describes a conductive organopolysiloxane elastomer using both furnace black and acetylene black.

However, the semi-conductive silicone rubber composition of this kind blended and dispersed with carbon black is ready to greatly vary in its resistance value within the semi-conductive region due to various factors, thus suffering from a problem with insufficient resistance stability and reproducibility. Such resistance variation principally results from the following factors:

(a) environmental change in temperature, humidity, etc., (b) change in blending amount of carbon black, (c) aging during applying a constant high voltage, and (d) voltage change during applying a high voltage.

That is, the problem (a) is to be encountered in an ion-conductive type rubber composition blended with conductive oil or plasticizer in addition to a small amount of conductive carbon black. That is, silicone rubber is impaired in its inherent environmental characteristics and made dependent of electric resistance upon environmental change, such as humidity or temperature. As a result, the resistance largely decreases at an elevated temperature and humidity. The problem (b) may arise in a rubber composition added with carbon black, such as furnace black of FEF, GPF or the like, acetylene black or Ketjen black for providing electric conductivity. That is, slight change of addition amount causes large resistance variation and hence makes it difficult to put electric resistance under control. In the problem (c), where a constant high voltage is continuously applied to a rubber composition added with carbon black similar to that of (b), the resistance value greatly decreases during the application of voltage. In the problem (d), when varying high voltage is applied to a rubber composition added with carbon black similar to that of (b), resistance value largely varies with variation of voltage (or the resistance value largely decreases with increase of voltage). This results in over-current flow and difficulty in controlling current.

Where a transfer roller as above is formed using a semi-conductive silicone rubber composition having such a resistance value as ready to largely vary due to the above factors, there is a necessity of using an accurate application-voltage control device to put required transfer current under control. This, however, incurs a problem with apparatus complexity or cost rise. In addition to the problem with resistance variation, there is also restriction that carbon black in a comparatively small amount only can be added in view of avoiding rubber from hardening as well as from worsening in operationality or workability. Thus, there has been inconvenience in providing resistance broadly within the range while adjusting carbon amount to meet the product application.

Incidentally, the above Japanese Patent Laid-open No. H10-254215 discloses a technology to stabilize the resistance value by dispersing two kinds of carbon black different in oil absorption characteristic (specifically, ketjen black and thermal black) in three kinds of rubber different in solubility parameters (specifically, nitrile-butadiene rubber, ethylene-propylene-dien rubber and chloroprene rubber or styrene-butadiene rubber).

SUMMARY OF THE INVENTION

Therefore, it is a primary object of the present invention to provide a novel semi-conductive silicone rubber composition.

Another object of the invention is to provide a semi-conductive silicone rubber composition having resistance value stable within the semi-conductive region.

The present inventors have eagerly made many studies and reached a completion of the present invention through the following finding. That is, a certain kind of soft carbon, although conventionally used exclusively as reinforcer or filler for less-hard rubber without considered as carbon black for giving conductivity, is surprisingly capable of providing a suitable range of conductivity to silicone rubber in a manner free from adverse effects upon formability, wherein a silicone rubber composition blended therewith is less dependent upon the changes of various factors including carbon blending amount and hence having a resistance value stable in various aspects, thus solving all the above-stated problems at a same time.

That is, the present invention has a structure given below as means to solve the problem.

(1) A semi-conductive silicone rubber composition contains carbon black, wherein the carbon black includes thermal black obtained by thermally cracking a natural gas and having a specific surface area—nitrogen absorption method of 8.0 to 10.0 m$^2$/g, a dibutyl phthalate absorption number of 30 to 40 cm$^3$/100 g and an averaged particle size of 200 to 330 nm.

(2) In the composition of (1), silicone rubber is heat cured rubber based on polyorganosiloxane.

(3) A rubber roll comprises: a conductive core member; and a silicone rubber layer coated on an outer peripheral surface of the conductive core member, the silicone rubber layer comprising a semi-conductive silicone rubber composition containing carbon black, the carbon black including thermal black obtained by thermally cracking a natural gas and having a specific surface area—nitrogen absorption method of 8.0 to 10.0 m$^2$/g, a dibutyl phthalate absorption number of 30 to 40 cm$^3$/100 g and an averaged particle size of 200 to 330 nm.

(4) In the composition of (3), silicone rubber is heat cured rubber based on polyorganosiloxane.

The semi-conductive silicone rubber composition is basically a polyorganosiloxane composition which is curable, at normal temperature or by heating, into a rubber resilient material and added with thermal black at least satisfying the above conditions. Various additives and the like may be blended as required.

The thermal black employed in the invention is carbon black produced by a thermal (or thermal cracking) method, i.e. thermally cracking a natural gas introduced in a furnace heated above a thermal-cracking temperature by burning fuel. The carbon black has large particle size, low structure and small specific surface area as compared to other furnace black, thus providing a merit of reduced impurity owing to the complete combustion method. The specific surface area—nitrogen absorption method must be within a range of 8.0 to 10.0 $m^2/g$, a dibutyl phthalate absorption number be 30 to 40 $cm^3/100$ g and an averaged particle size of 200 to 330 nm (hereinafter, the thermal black fallen within this range is referred to as MT carbon).

MT carbon is capable of providing silicone rubber with proper conductivity, against the generally accepted concept that the carbon black having a large particle size and low structure is improper as a conductivity-applying agent. As a reason of this, it is to be considered that particles of MT carbon be enhanced in degree of contact with one another because silicone rubber is by far softer than other rubber.

MT carbon includes N991 (product name, produced by Cancarb), N908-UP (product name, produced by Cancarb), LPT (product name, produced by Cancarb) and Arosperse (product name, produced by Engineered Carbons).

The polyorganosiloxane base polymer, as a principal ingredient of the semi-conductive silicone rubber composition of the invention, suitably employs heat cured rubber, such as dimethyl siloxane and phenyl siloxane. One or two or more in combination of these of silicone raw rubber may be used. The polyorganosiloxane polymer is added with MT carbon as an essential ingredient. Besides, various additives as arbitrary ingredients are to be blended and dispersed homogeneously as required which include curing agents, such as organic peroxide vulcanization agent and addition cross-linking agent, silica reinforcing filler, azodicarbonaamide or isobuthynitrile-azide blowing agent, other heat-resisting antioxidant, workability auxiliaries and so on.

The semi-conductive silicone rubber composition of the invention has a resistance value moderately varying with variation of carbon addition amount. For example, the change of resistance value from $10^{12}$ Ω to $10^4$ Ω requires an increase an MT carbon amount by nearly 25 weight part. Consequently, in a semi-conductive region where resistance value abruptly varies with variation in carbon-black addition amount, the resistance value is less affected and varied even if there is slight difference in carbon black content caused due to loss upon kneading or is delicate difference in dispersion caused upon forming such as by extrusion. As a result, the silicone rubber composition is high in resistance-value reproducibility and excellent in mass-production stability thus being utilized for various applications of semi-conductive rubber products. Meanwhile, there is an advantage that the resistance value is almost stable when applying a constant high voltage for a long time.

On the other hand, the semi-conductive silicone rubber composition of the invention exhibits preferred stability of resistance value against variation in application voltage. For example, provided that a current value upon applying 1000V is $I_1$ and a current value upon applying 2000V is $I_2$, then $I_2/2I_1$ lies within a range of 1.2 to 1.5. This range represents a current value available almost in proportion to application voltage. Thus, dependency on voltage is extremely low.

The semi-conductive silicone rubber composition can make use of the characteristics that MT carbon is to be blended much in amount in a manner free from worsening operationality or workability. By adjusting the blending amount, to what degree conductivity is given is arbitrarily selectable from a broad range. The blending amount of MT carbon is not especially limited to but preferably selected within a range of 30 to 100 weight part for 100 weight part of silicone rubber in a manner depending upon the application. The invention is not an ion conductive type rubber composition and does not contain conductive oil or plasticizer at all. Rather, the invention is given conductivity by the addition of MT carbon singly. Consequently, resistance value can be held stable in a manner free from bad affection on the environmental characteristics inherently possessed by silicon rubber and from being affected by environmental change in temperature or humidity.

Incidentally, where using carbon black fallen outside the range in any of values of specific surface area—nitrogen absorption method, dibutyl phthalate absorption number and averaged particle size or the carbon black obtained by other process than thermally cracking a natural gas, it is impossible to obtain stable resistance value or desired dependency on voltage within the above-mentioned middle-resistance range. Moreover, favorable operationality is not to be provided during blending in great amount.

According to the semi-conductive silicone rubber composition of the present invention, the stability of resistance value in a semi-conductive region can be greatly improved in broad aspects while keeping the excellent environmental characteristic of silicone rubber stable in electric resistance against environmental change. Accordingly, the semi-conductive silicone rubber composition of the invention is well suited for the application for conductive members such as conductive rolls.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Carbon Blending Amount and Resistance Value (Embodiment 1)

Used as raw rubber are 50 weight part of TSE260-3U (product name, produced by GE Toshiba Silicone) and 50 weight part of TSE260-5U (product name, produced by GE Toshiba Silicone). To this were added 3 weight part of TC-4 (product name, produced by GE Toshiba Silicone) as an organic peroxide cross-linking agent and 65 weight part of N991 (product name, produced by Cancarb) as MT carbon having a specific surface area—nitrogen absorption method of 9.0 $m^2/g$, a dibutyl phthalate absorption number of 34 $cm^3/100$ g and an averaged particle size of 270 nm. This was then kneaded through an 8-inch open roll and fully mixed and dispersed into a semi-conductive composition. The semi-conductive composition was put in a press-vulcanizer and subjected to first vulcanization at 170° C. for 15 minutes followed by second vulcanization at 200° C. for 2 hours, thereby being formed into a sheet sample (12 cm long×13 cm wide×3 mm thick).

Figure 1:
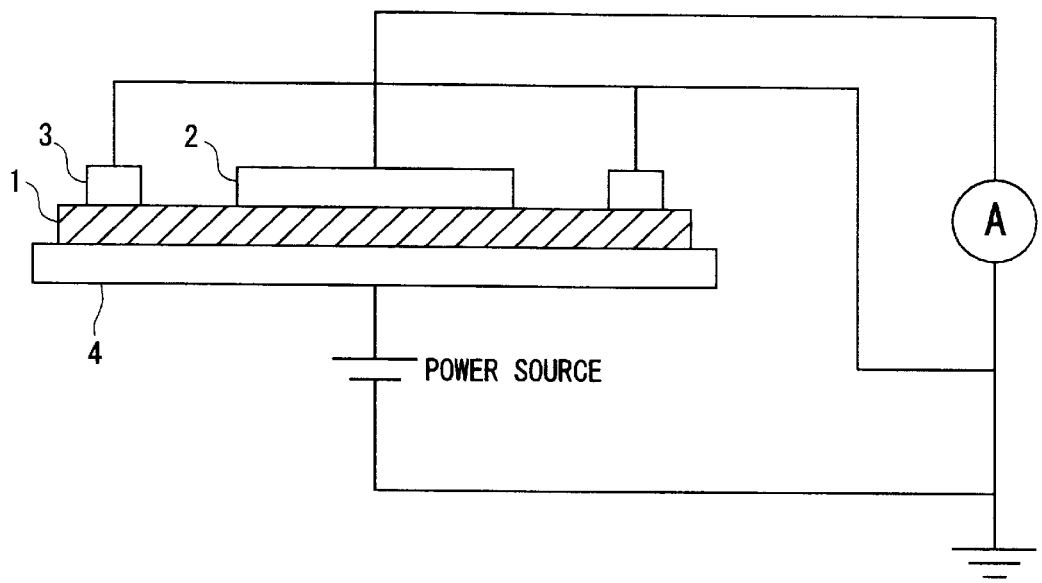
FIG. 1 is an illustrative view for explaining a method of measuring an electric current value through a sheet sample obtained in embodiment of the invention and comparative examples.
Figure 2:
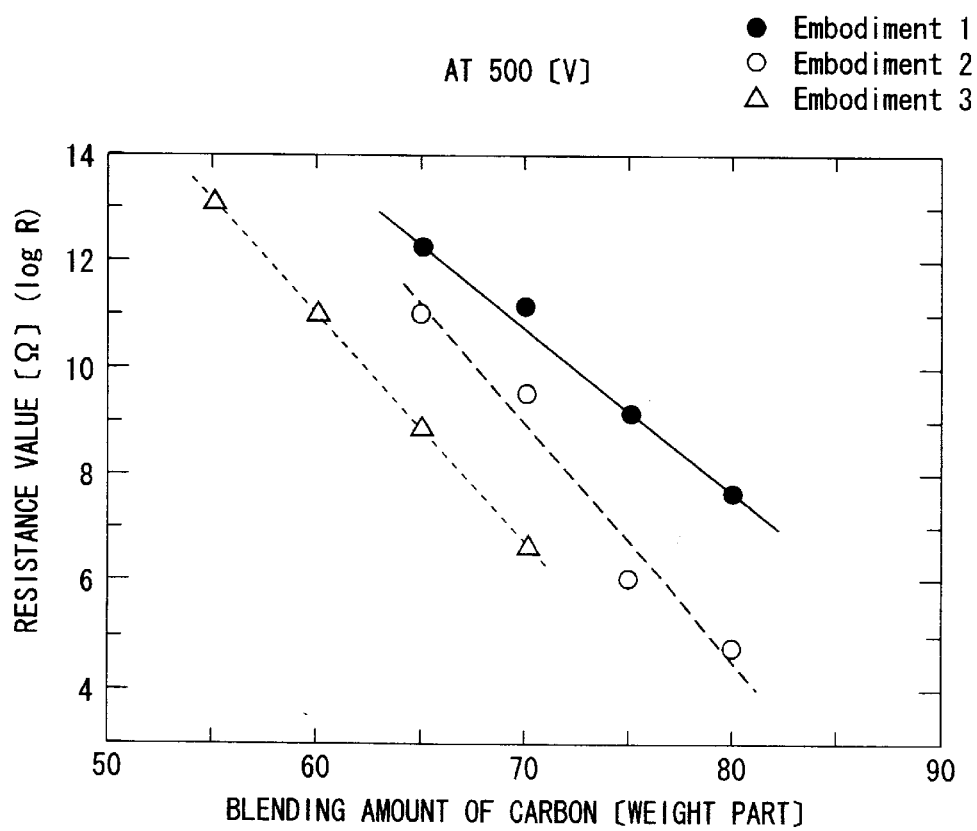
FIG. 2 is a graph showing a relationship between a carbon blending amount and resistance value in the sheet sample obtained in Embodiments 1, 2 and 3.

Then, the sheet sample 1 was sandwiched between the upper-arranged main electrode 2 and guard electrode 3 and the lower-arranged counter electrode 4, as shown in FIG. 1. In this state, a current value due to application of a voltage 500 V was measured at normal temperature and humidity by using an ammeter A. At the same time, a resistance value ($\Omega$) of the sample 1 was determined in compliance with Ohm's law. Similarly, the blending amount of N991 was changed as 70 weight part, 75 weight part and 80 weight part, in order to obtain resistance values. Results were obtained as shown in Table 1 and FIG. 2.

(Embodiment 2)

Samples with each carbon blending amount were prepared and measured similarly to Embodiment 1 excepting that the MT carbon of Embodiment 1 was changed to N908-UP (product name, produced by Cancarb) having a specific surface area—nitrogen absorption method of 9.5 $m^2/g$, a dibutyl phthalate absorption number of 37 $cm^3/100$ g and mean particle size of 240 nm. Results were obtained as shown in table 1 and FIG. 2.

(Embodiment 3)

Samples with each carbon blending amount were prepared and measured similarly to Embodiment 1 excepting that the MT carbon of Embodiment 1 was changed to LPT (product name, produced by Cancarb) having a specific surface area—nitrogen absorption method of 8.5 $m^2/g$, a dibutyl phthalate absorption number of 34 $cm^3/100$ g and an averaged particle size of 305 nm with the blending amount varied as 55 weight part, 60 weight part, 65 weight part and 70 weight part. Results were obtained as shown in Table 1 and FIG. 2.

COMPARATIVE EXAMPLE 1

Figure 3:
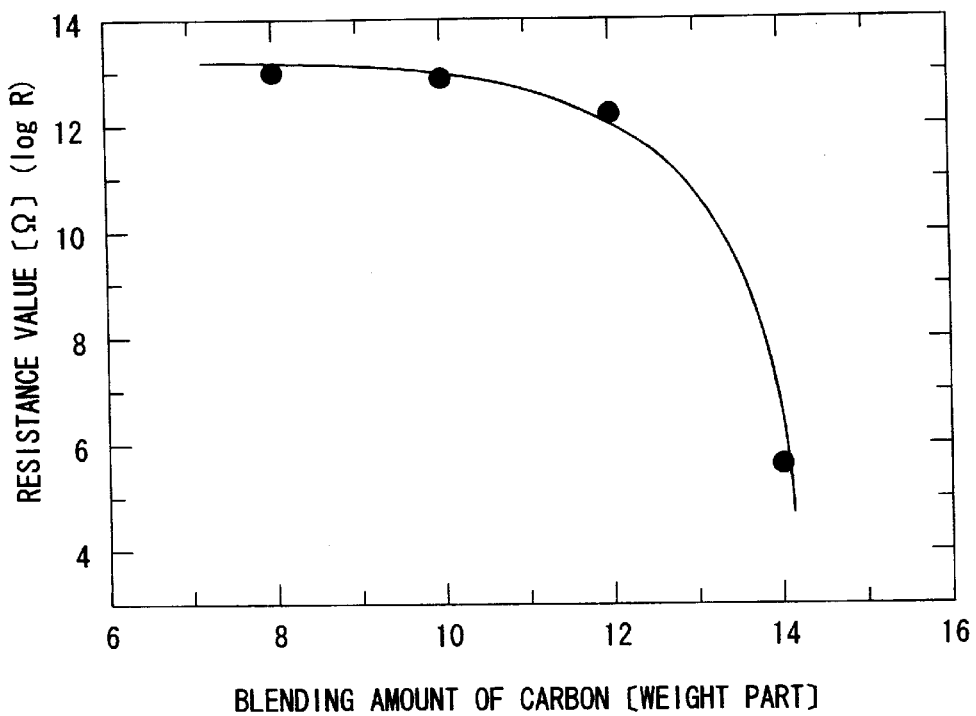
FIG. 3 is a graph showing a relationship between a carbon blending amount and a resistance value in the sheet sample obtained in Embodiment 1.

For the purpose of comparison with the invention, samples with each carbon blending amount were prepared and measured similarly to Embodiment 1 excepting that the carbon black of Embodiment 1 was changed to Vulcan XC-72 (product name, produced by Cabot) having a specific surface area—nitrogen absorption method of 254 $m^2/g$, a dibutyl phthalate absorption number of 174 $cm^3/100$ g and an averaged particle size of 30 nm. Results were obtained as shown in Table 2 and FIG. 3.

TABLE 2

| | Resistance Value ($\Omega$) Blending Amount of VULCAN XC-72 Weight Part | | | |
|---|---|---|---|---|
| | 8 | 10 | 12 | 14 |
| Comparative Example 1 | $1.0 \times 10^{13}$ | $7.0 \times 10^{12}$ | $1.7 \times 10^{12}$ | $4.7 \times 10^{5}$ |

COMPARATIVE EXAMPLE 2

Figure 4:
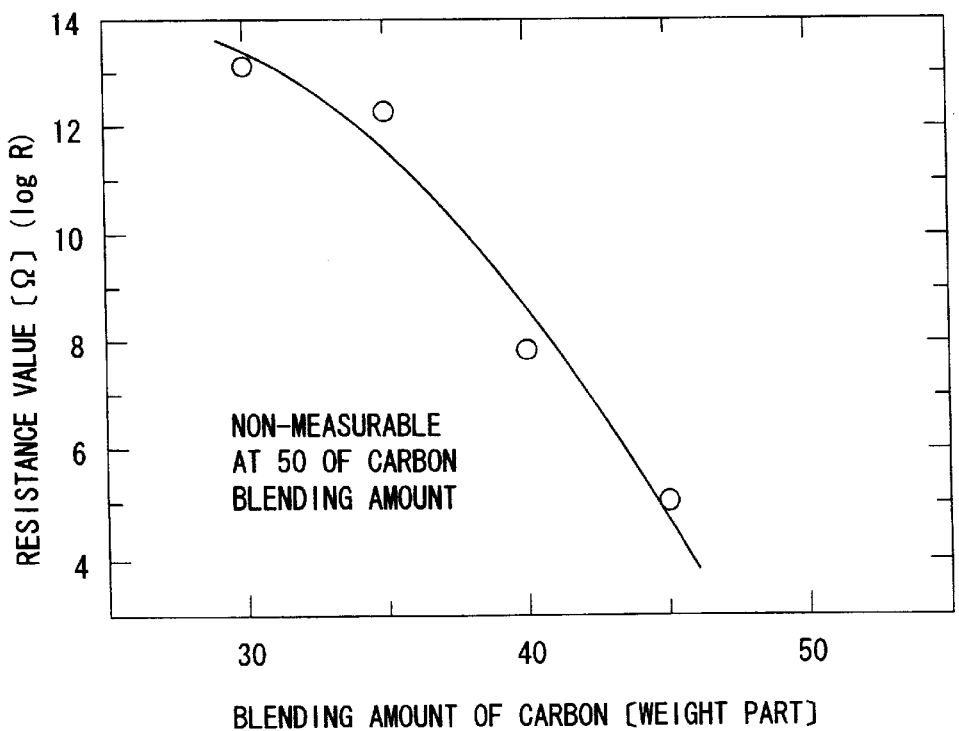
FIG. 4 is a graph showing a relationship between a carbon blending amount and a resistance value in the sheet sample obtained in Comparative Example 2.

Samples with each carbon blending amount were prepared and measured similarly to Embodiment 1 excepting that the carbon black of Embodiment 1 was changed to Asahi Thermal (product name, produced by Asahi Carbon) having a specific surface area—nitrogen absorption method of 24.0 $m^2/g$, a dibutyl phthalate absorption number of 28 $cm^3/100$ g and an averaged particle size of 80 nm with the blending amount varied as 30 weight part, 35 weight part, 40 weight part and 45 weight part. Results were obtained as shown in Table 3 and FIG. 4.

TABLE 3

| | Resistance Value ($\Omega$) Blending Amount of ASAHI THERMAL (Weight Part) | | | |
|---|---|---|---|---|
| | 30 | 35 | 40 | 45 |
| Comparative Example 2 | $1.6 \times 10^{11}$ | $2.3 \times 10^{12}$ | $8.2 \times 10^{7}$ | $1.1 \times 10^{5}$ |

COMPARATIVE EXAMPLE 3

Samples with each carbon blending amount were prepared and measured similarly to Embodiment 1 excepting that the carbon black of Embodiment 1 was changed to Sevacarb MT-CI (product name, produced by Columbian Carbon) made by the oil furnace process and having a specific surface area—nitrogen absorption method of 8.0 $m^2/g$, a dibutyl phthalate absorption number of 41 $cm^3/100$ g and an averaged particle size of 350 nm with the blending

TABLE 1

Figure 5:
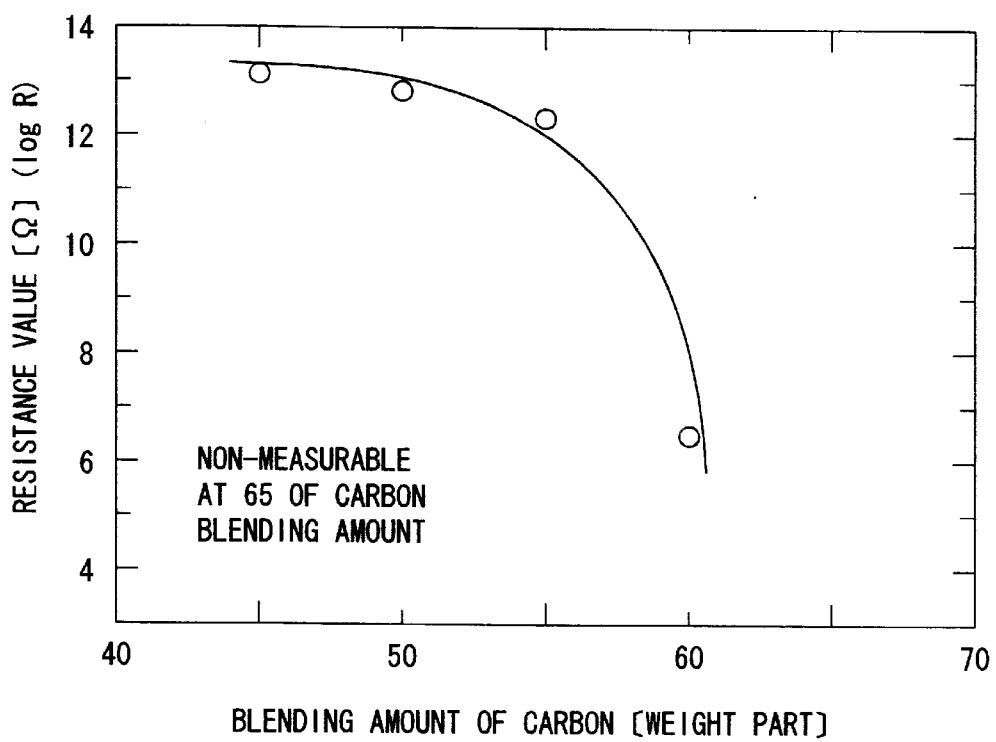
FIG. 5 is a graph showing a relationship between a carbon blending amount and a resistance value in the sheet sample obtained in Comparative Example 3.

| | Resistance Value ($\Omega$) Blending Amount of MT Carbon (Weight Part) | | | | | |
|---|---|---|---|---|---|---|
| | 55 | 60 | 65 | 70 | 75 | 80 |
| Embodiment 1 | — | — | $1.8 \times 10^{12}$ | $1.6 \times 10^{11}$ | $1.8 \times 10^{9}$ | $5.5 \times 10^{7}$ |
| Embodiment 2 | — | — | $1.2 \times 10^{11}$ | $4.0 \times 10^{9}$ | $1.3 \times 10^{6}$ | $6.5 \times 10^{4}$ |
| Embodiment 3 | $1.1 \times 10^{13}$ | $1.1 \times 10^{11}$ | $7.4 \times 10^{8}$ | $4.4 \times 10^{6}$ | — | — | amount varied as 45 weight part, 50 weight part, 55 weight part and 60 weight part. Results were obtained as shown in Table 4 and FIG. 5.

TABLE 4

| | Resistance Value (Ω) Blending Amount of SEVACAB MT-CI Weight Part | | | |
|---|---|---|---|---|
| | 45 | 50 | 55 | 60 |
| Comparative Example 3 | $1.0 \times 10^{13}$ | $5.4 \times 10^{12}$ | $2.2 \times 10^{12}$ | $3.9 \times 10^{6}$ |

It was confirmed from Tables 1 to 4 and FIGS. 2 to 5 that Embodiments 1, 2 and 3 using MT carbon increased in carbon blending amount are free from abrupt lower in resistance value. If the MT carbon is increased by about 25 weight part with respect to 100 weight part of silicone rubber, the resistance value moderately lowers in a proportional fashion. In contrast, it was confirmed in each Comparative Example that there were regions where the resistance value is abruptly lowered by slight change in weight part (e.g. in Comparative Example 1, increase by 2 weight part from 12 to 14 weight part).

Aging Upon Application of Constant Voltage
(Embodiment 4)

Figure 6:
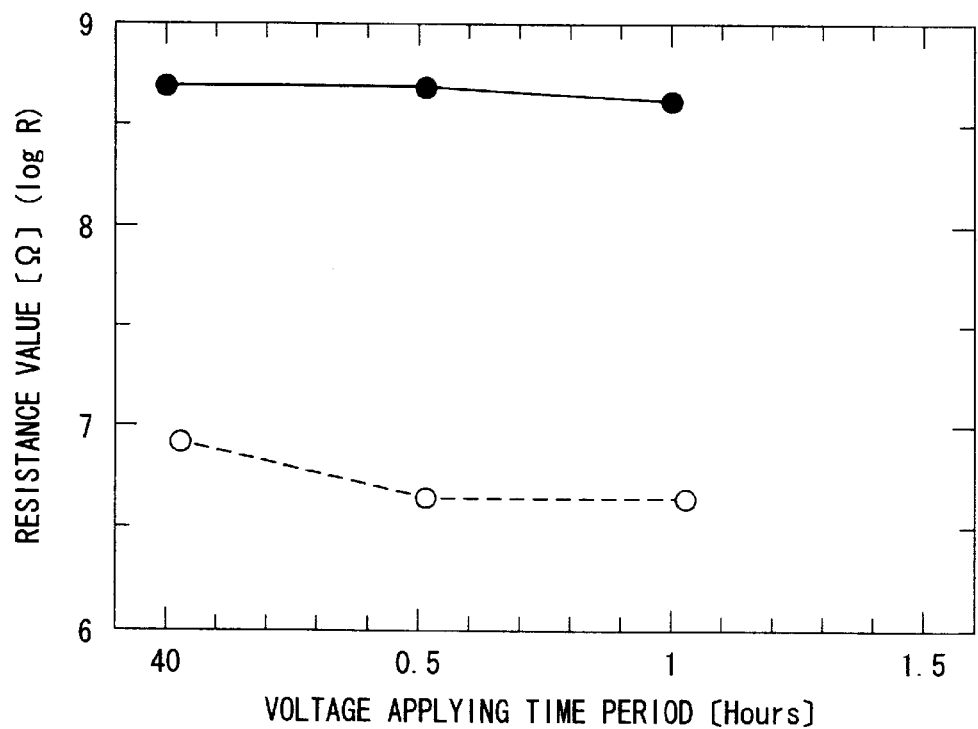
FIG. 6 is a graph showing a relationship between a voltage application time and a resistance value on the sheet samples obtained in Embodiment 4 and Comparative Example 4.

A samples was prepared and measured similarly to Embodiment 1 excepting that the silicone raw rubber of Embodiment 1 was changed to 100 weight part of TSE260-3U and 70 weight part of above-mentioned N991 was added. The resistance value was determined at respective times of elapsing 30 minutes and 1 hour in the state of continuously applying a voltage of 500 V. Results were obtained as shown in FIG. 6.

COMPARATIVE EXAMPLE 4

A sample was prepared and measured similarly to Embodiment 4 except in that the N991 of Embodiment 4 was changed to 40 weight part of SRF-L#35 (product name, produced by Asahi Carbon) having a specific surface area—nitrogen absorption method of 24.0 m$^2$/g, a dibutyl phthalate absorption number of 50 cm$^3$/100 g and an averaged particle size of 78 nm. Results were obtained as shown in FIG. 6.

(Embodiment 5)

A sample was prepared and measured similarly to Embodiment 1 excepting that above-mentioned N991 was added in 75 weight part to the silicone raw rubber of Embodiment 1. Resistance values were determined at respective times of elapsing 30 minutes, 1 hour and thereafter every hour at or before elapsing 4 hours. Results were obtained as shown in FIG. 7.

COMPARATIVE EXAMPLE 5

A sample was prepared and measured similarly to Embodiment 5 excepting that N991 of Embodiment 5 was changed to 60 weight part of Sevacarb MT-CI (product name, produced by Columbian Carbon). Results were obtained as shown in FIG. 7.

Figure 7:
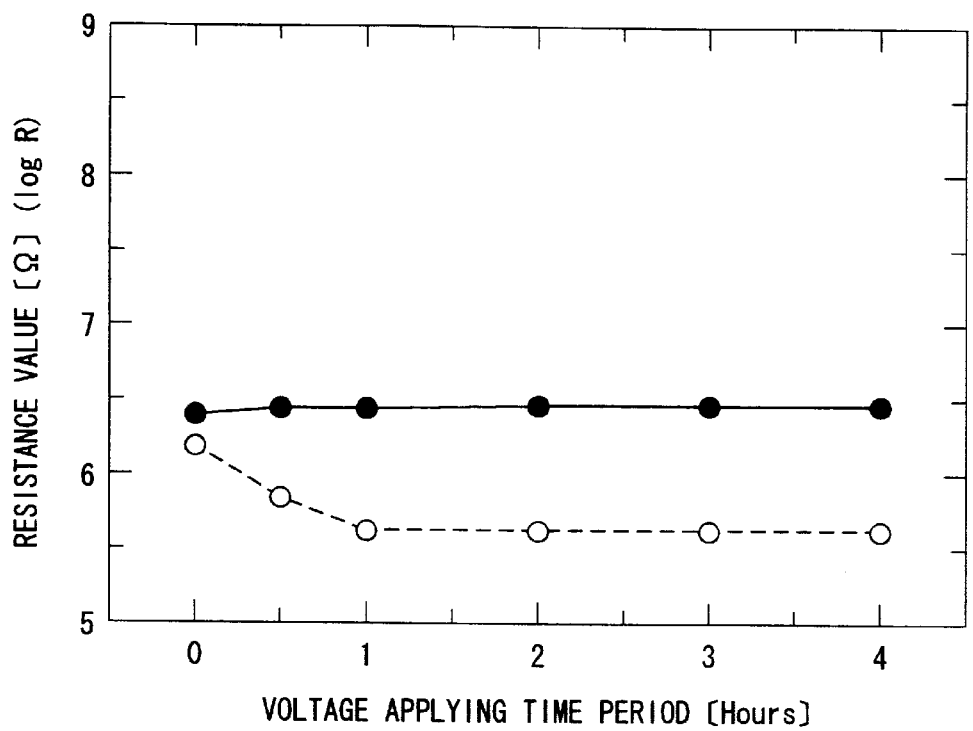
FIG. 7 is a graph showing a relationship between a voltage application time and a resistance value on the sheet sample obtained in Embodiment 5 and Comparative Example 5.

It was confirmed from FIGS. 6 and 7 that in Embodiments 4 and 5 there are almost no variations in resistance value during application of voltage whereas in Comparative Examples 4 and 5 the resistance value largely lowered at respective times of after elapsing 30 minutes and 1 hour.

Dependency on Voltage Change
(Embodiment 6)

A sample was prepared similarly to Embodiment 1 excepting that N991 mentioned above was added in 45 weight part as silicone raw rubber to a 100 weight part of TSE201 (product name, produced by GE Toshiba Silicone). The current values on the sample were measured at normal temperature and humidity by using the ammeter while changing the application voltage from 0 to 2000 V. A resistance value R (Ω·cm) of the sample when 500 V was applied was determined based on Ohm's law. Results are shown in Table 5 and FIG. 8.

(Embodiment 7)

A sample was prepared and measured similarly to Embodiment 6 excepting that the silicone raw rubber of Embodiment 6 was changed to TSE260-5U and the blending amount of N991 was changed to 75 weight part. Results were obtained as shown in Table 5.

(Embodiment 8)

A sample was prepared and measured similarly to Embodiment 6 excepting that N991 of Embodiment 6 was changed to 45 weight part of LPT. A result was obtained as shown in Table 5.

(Embodiment 9)

A sample was prepared and measured similarly to Embodiment 6 excepting that the LPT of Embodiment 8 was changed in blending amount to 70 weight part. A result was obtained as shown in Table 5.

(Embodiment 10)

A sample was prepared and measured similarly to Embodiment 6 excepting that the silicone raw rubber of Embodiment 6 was changed to TSE260-5U and the N991 was changed to 70 weight part of N908-UP. A result was obtained as shown in Table 5.

COMPARATIVE EXAMPLE 6

A sample was prepared and measured similarly to Embodiment 6 excepting that the silicone raw rubber of Embodiment 6 was changed to TSE260-SU and the carbon black was changed to 60 weight part of Sevacarb MT-CI. Result were obtained as shown in Table 5 and FIG. 8.

COMPARATIVE EXAMPLE 7

A sample was prepared and measured similarly to Comparative Example 6 excepting that the carbon black of Comparative Example 6 was changed to 40 weight part of the SRF-L#35 (product name, produced by Asahi Carbon). A result was obtained as shown in Table 5.

COMPARATIVE EXAMPLE 8

A sample was prepared and measured similarly to Comparative Example 6 excepting that the carbon black of Comparative Example 6 was changed to 18 weight part of HAF#70 (product name, produced by Asahi Carbon) having a specific surface area—nitrogen absorption method of 77.0 m$^2$/g, a dibutyl phthalate absorption number of 101 cm$^3$/100 g and an averaged particle size of 26 nm. A result was obtained as shown in Table 5.

COMPARATIVE EXAMPLE 9

A sample was prepared and measured similarly to Comparative Example 6 excepting that the carbon black of Comparative Example 6 was changed to 30 weight part of Raven 22 (product name, produced by Columbian Carbon) having a specific surface area—nitrogen absorption method of 22.0 m$^2$/g, a dibutyl phthalate absorption number of 113 cm$^3$/100 g and an averaged particle size of 83 nm. A result was obtained as shown in Table 5.

TABLE 5

|  | Voltage 500 (V) | | Voltage 1000 (V) Current Value $I_1$ (μA) | Voltage 2000 (V) Current Value $I_2$ (μA) | Linearity Magnification (Times) $I_2/2 \times I_1$ |
|---|---|---|---|---|---|
|  | Volume Resistance Value $R_v$ (Ω · cm) | Current Value I (μA) | | | |
| Embodiment 6 | $1.1 \times 10^{10}$ | 48 | 135 | 380 | 1.4 |
| Embodiment 7 | $9.1 \times 10^{8}$ | 417 | 824 | 1988 | 1.2 |
| Embodiment 8 | $7.6 \times 10^{9}$ | 205 | 542 | 1352 | 1.5 |
| Embodiment 9 | $5.2 \times 10^{9}$ | 256 | 593 | 1557 | 1.3 |
| Embodiment 10 | $1.5 \times 10^{10}$ | 53 | 133 | 382 | 1.4 |
| Comparative Example 6 | $6.5 \times 10^{9}$ | 250 | 833 | Non-Measurable | — |
| Comparative Example 7 | $1.2 \times 10^{9}$ | 368 | 1700 | Non-Measurable | — |
| Comparative Example 8 | $4.4 \times 10^{9}$ | 280 | 1360 | Non-Measurable | — |
| Comparative Example 9 | $4.9 \times 10^{9}$ | 278 | 1330 | Non-Measurable | — |

Figure 8:
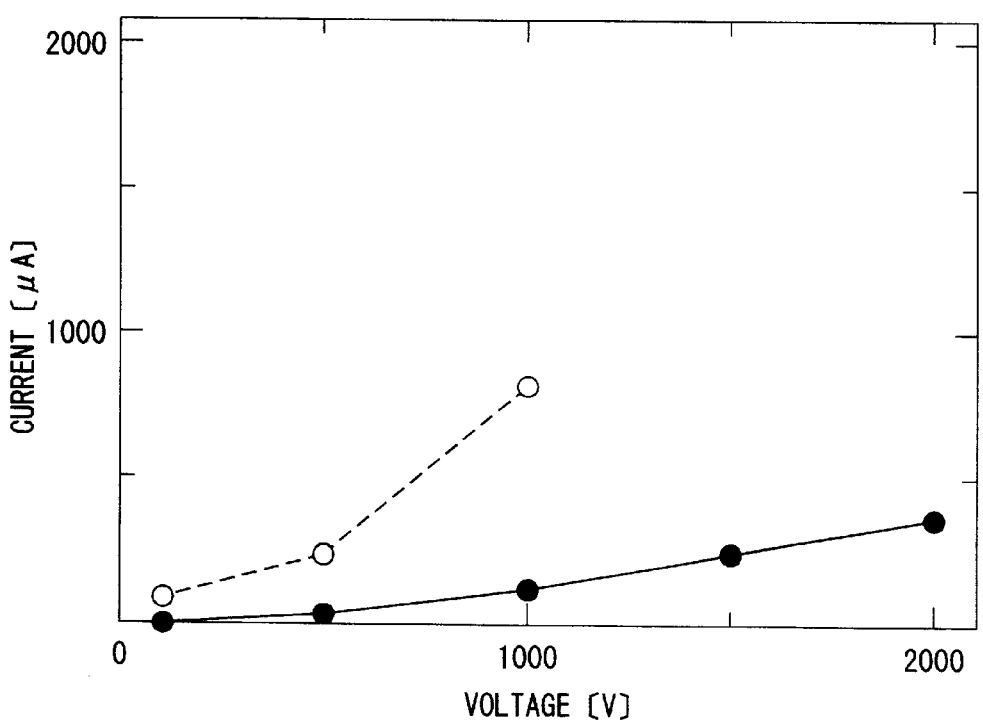
FIG. 8 is a graph showing a relationship between a voltage and a current on the sheet samples obtained in Embodiment 6 and Comparative Example 6.

From Table 5 and FIG. 8, it was confirmed that Embodiments 6 to 10 using MT carbon have a resistance value held almost constant even if the application voltage is increased. Provided that a current value when applying 1000 V is $I_1$ and a current value when applying 2000 V is $I_2$, the linear magnification expressed by $I_2/2_1$ is within a range of 1.2 to 1.5 and the dependency on voltage is extremely low. In contrast, in Comparative Examples 6 to 9 without using MT carbon, the resistance value greatly decreases with increase of application voltage. When 2000 V was applied, overcurrent flowed to make impossible to measure a current value $I_2$. Thus, a linear magnification could not be calculated.

Although the present invention has been described and illustrated in detail, it is clearly understood that the same is by way of illustration and Example only and is not to be taken by way of limitation, the spirit and scope of the present invention being limited only by the terms of the appended claims.

What is claimed is:

1. A semi-conductive silicone rubber composition containing carbon black, wherein said carbon black includes thermal black obtained by thermally cracking a natural gas and having a specific surface area (nitrogen absorption method) of 8.5 to 10.0 m²/g, a dibutyl phthalate absorption number of 30 to 40 cm³/100 g and an average particle size of 200 to 330 nm, said silicone rubber composition having a substantially stable resistance value despite slight variations in blending amount of said thermal black.

2. A composition according to claim 1, wherein silicone rubber is heat cured rubber based on polyorganosiloxane.

3. A rubber roll comprising:
   a conductive core member; and
   a silicone rubber layer coated on an outer peripheral surface of said conductive core member, said silicone rubber layer comprising a semi-conductive silicone rubber composition containing carbon black, said carbon black including thermal black obtained by thermally cracking a natural gas and having a specific surface area (nitrogen absorption method) of 8.5 to 10.0 m²/g, a dibutyl phthalate absorption number of 30 to 40 cm³/100 g and an average particle size of 200 to 330 nm, said silicone rubber composition having a substantially stable resistance value despite slight variations in blending amount of said thermal black.

4. A rubber roll according to claim 3, wherein silicone rubber is heat cured rubber based on polyorganosiloxane.

* * * * *